United States Patent
Yang et al.

(10) Patent No.: US 10,635,913 B2
(45) Date of Patent: Apr. 28, 2020

(54) PATH PLANNING METHOD AND RELATED NAVIGATION DEVICE

(71) Applicant: MEDIATEK INC., Hsin-Chu (TW)

(72) Inventors: Kai-Min Yang, Hsinchu (TW); Chih-Kai Chang, Taichung (TW); Tsu-Ming Liu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 245 days.

(21) Appl. No.: 15/786,559

(22) Filed: Oct. 17, 2017

(65) Prior Publication Data

US 2018/0107226 A1 Apr. 19, 2018

Related U.S. Application Data

(60) Provisional application No. 62/408,869, filed on Oct. 17, 2016.

(51) Int. Cl.

| G06K 9/00 | (2006.01) |
| G05D 1/04 | (2006.01) |
| G08G 5/00 | (2006.01) |
| G08G 5/04 | (2006.01) |
| G05D 1/00 | (2006.01) |
| G05D 1/06 | (2006.01) |
| G05D 1/02 | (2020.01) |

(52) U.S. Cl.
CPC ....... *G06K 9/00805* (2013.01); *G05D 1/0088* (2013.01); *G05D 1/0246* (2013.01); *G05D 1/0274* (2013.01); *G05D 1/042* (2013.01); *G05D 1/0676* (2013.01); *G08G 5/0069* (2013.01); *G08G 5/045* (2013.01); *B64C 2201/141* (2013.01); *G05D 2201/0203* (2013.01)

(58) Field of Classification Search
CPC .................................................. G06K 9/00805
See application file for complete search history.

(56) References Cited

U.S. PATENT DOCUMENTS

| 9,164,510 | B2* | 10/2015 | Mian | ..................... G05D 1/0212 |
| 9,248,835 | B2* | 2/2016 | Tanzmeister | ...... B60W 30/0956 |
| 2018/0012494 | A1* | 1/2018 | Walessa | ................... G08G 1/16 |
| 2018/0247216 | A1* | 8/2018 | Mottin | ................... G06N 7/005 |

* cited by examiner

*Primary Examiner* — Todd M Melton
(74) *Attorney, Agent, or Firm* — Winston Hsu

(57) ABSTRACT

A path planning method applied to a navigation device includes acquiring a two-dimensional depth map, transforming the two-dimensional depth map into a gray distribution map via statistics of pixel values on the two-dimensional depth map, computing a space matching map by arranging pixel counts on the gray distribution map, and computing a weighting value about each angle range of the space matching map in accordance with a distance from location of a pixel count to a reference point of the space matching map. The weighting value represents existential probability of an obstacle within the said angle range and a probable distance between the navigation device and the obstacle.

26 Claims, 20 Drawing Sheets

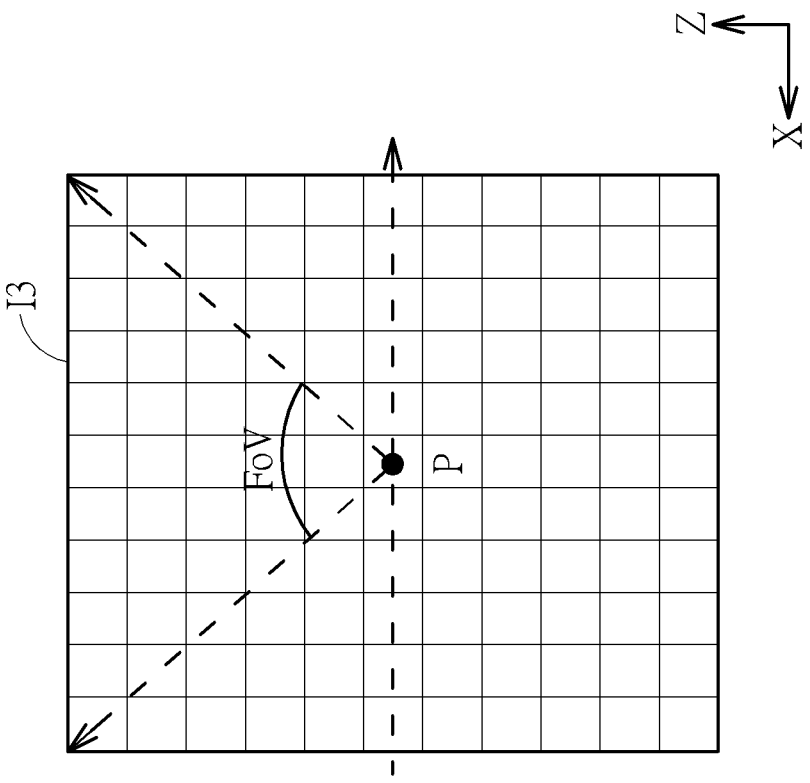
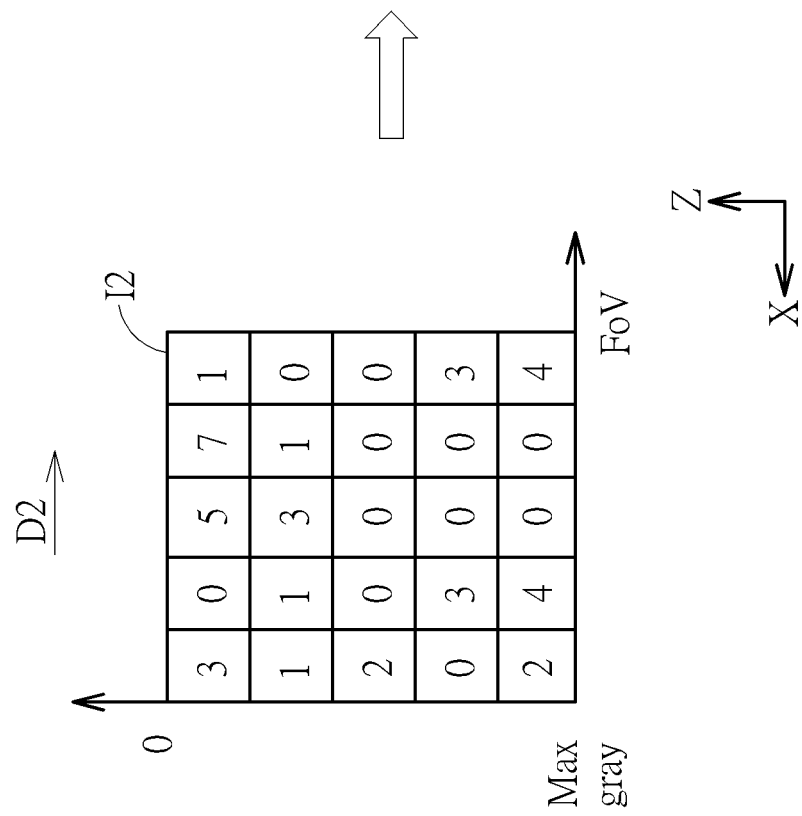
FIG. 8

PATH PLANNING METHOD AND RELATED NAVIGATION DEVICE

CROSS REFERENCE TO RELATED APPLICATIONS

This application claims the benefit of U.S. provisional application No. 62/408,869, filed on Oct. 17, 2016. The disclosures of the prior application are incorporated herein by reference herein in their entirety.

BACKGROUND

The present invention relates to a path planning method and a related navigation device, and more particularly, to a path planning method and a related navigation device with real-time processing function without any database or environment map.

In the field of automatic navigation, a conventional robot is extensively applied in the static working environment because of its predictable property. For example, the robotic cleaner is used to sweep indoor environment, a scanner of the robotic cleaner scans furniture decoration of the indoor environment to establish a map containing location information about the wall, the table, the chair, the cabinet and so on, and to plan a steering path without impacting the furniture in accordance with the map; if the robotic cleaner is put into a strange working environment or the furniture inside the static working environment is shifted, the robotic cleaner will be confused and cannot dodge the obstacle. Further, the scanner of the robotic cleaner includes a row of radars, the map made by the row of radars is one-directional information for determining a steering direction, the robotic cleaner is constrained to shift on the planar surface at the one-directional steering direction and unable to establish the two-dimensional map or the three-dimensional map for stereo navigation.

SUMMARY

The present invention provides a path planning method and a related navigation device with real-time processing function without any database or environment map for solving above drawbacks.

According to the claimed invention, a path planning method applied to a navigation device includes acquiring a two-dimensional depth map, transforming the two-dimensional depth map into a gray distribution map via statistics of pixel values on the two-dimensional depth map, computing a space matching map by arranging pixel counts on the gray distribution map, and computing a weighting value about each angle range of the space matching map in accordance with a distance from location of a pixel count to a reference point of the space matching map. The weighting value represents existential probability of an obstacle within the said angle range and a probable distance between the navigation device and the obstacle.

According to the claimed invention, a navigation device with a path planning function includes an data communication unit and a computing processor. The data communication unit is adapted to acquire a two-dimensional depth map. The computing processor is electrically connected with the data communication unit and adapted to analyze a two-dimensional depth map, to transform the two-dimensional depth map into a gray distribution map via statistics of pixel values on the two-dimensional depth map, to compute a space matching map by arranging pixel counts on the gray distribution map, and to acquire a weighting value about each angle range of the space matching map in accordance with a distance from location of a pixel count to a reference point of the space matching map. The weighting value represents existential probability of an obstacle within the said angle range and a probable distance between the navigation device and the obstacle.

The navigation device of the present invention has a tracking system, a depth sensing system and a control system, the tracking system analyzes orientation of the target to provide a target angle and a target distance relative to the navigation device, and the depth sensing system generates the depth map for executing the path planning method. The path planning method of the present invention can acquire the steering direction and the steering speed by computation of the target angle, the target distance and the depth map, so as to identify whether the obstacle exists in space and plan the positive path according to the existential probability of an obstacle within the whole angle ranges in space and the probable distance between the obstacle and the navigation device, and the control system can move the navigation device to steer clear of the obstacle. It should be further mentioned that the path planning method can distinguish between the dense mesh and the loose mesh, the navigation device can be stopped moving when detecting the dense mesh far ahead, and further can move on when detecting the loose mesh till approaching the obstacle. In the decision of steering direction, the path planning method can have priority in following the last steering direction to avoid the navigation device from frequent turning, and the path planning method further can have priority in moving toward roomy space even though the decided steering direction may not directly point the target.

The navigation device with the path planning function can be applied to the autonomous vehicle, the path planning function utilizes the two-dimensional depth map (one of the stripes) to execute analysis of the two-dimensional gray distribution map and space matching map, to make a policy decision of the one-dimensional obstacle probability, and the steering direction can be determined. The navigation device further can be applied to the UAV, the path planning function utilizes the stripes on the depth map to acquire the plurality of obstacle probability histograms, the plurality of obstacle probability histograms can be merged to form the two-dimensional obstacle probability distribution map, and the level steering direction and the steering angle of depression and elevation can be determined accordingly. Besides, the navigation device can be applied to a blind guiding apparatus, or applied to a virtual reality helmet because the user cannot look around by shelter of the helmet.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 to FIG. 10 respectively are diagrams of showing the gray distribution map transformed into a space matching map according to different embodiments of the present invention.

DETAILED DESCRIPTION

Figure 1:
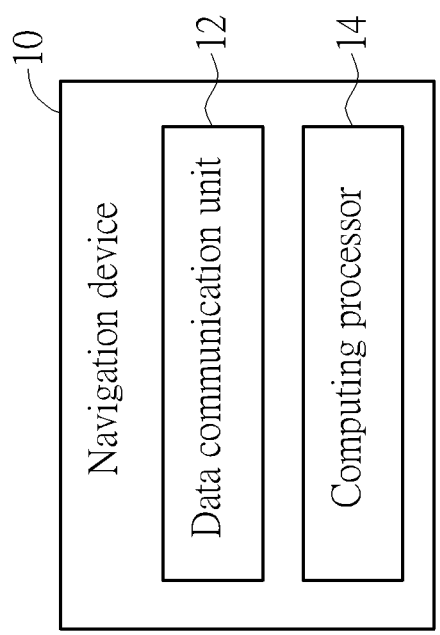
FIG. 1 is a functional block diagram of a navigation device according to an embodiment of the present invention.
Figure 2:
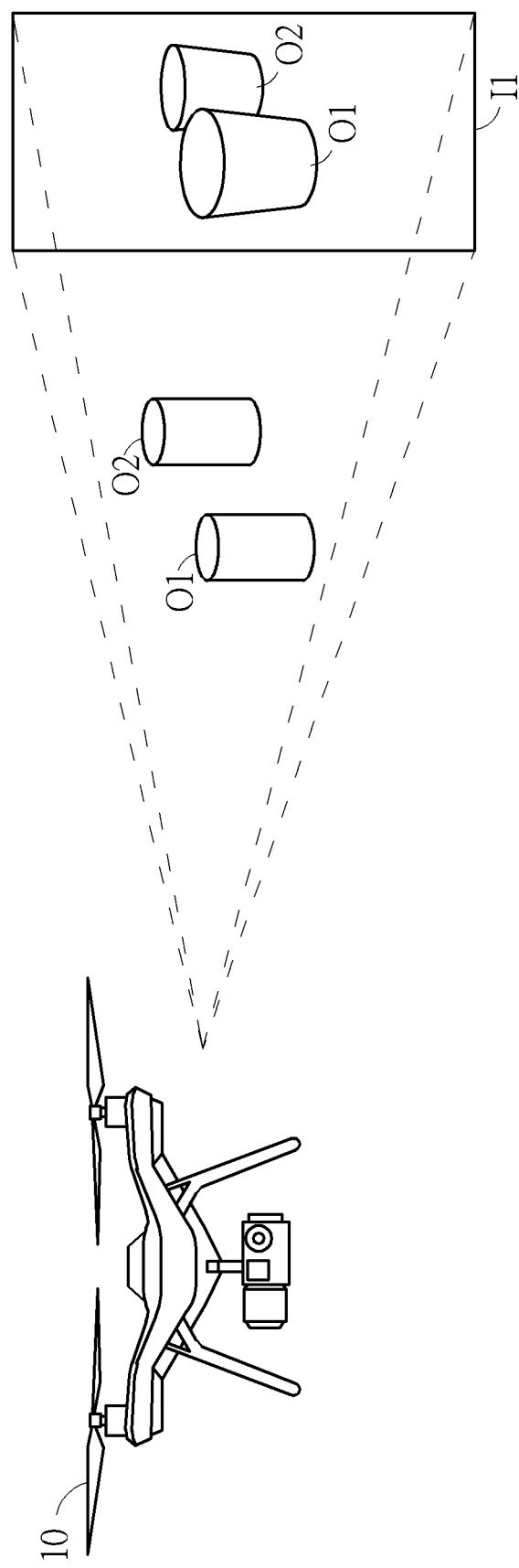
FIG. 2 is an application diagram of the navigation device according to the embodiment of the present invention.

Please refer to FIG. 1 and FIG. 2. FIG. 1 is a functional block diagram of a navigation device 10 according to an embodiment of the present invention. FIG. 2 is an application diagram of the navigation device 10 according to the embodiment of the present invention. The navigation device 10 includes a data communication unit 12 and a computing processor 14 electrically connected with each other. The data communication unit 12 is used to receive a two-dimensional depth map, the two-dimensional depth map can be obtained according to a monitoring image captured by a built-in image capturing unit or an external image capturing unit, and the computing processor 14 executes a path planning function by analyzing the two-dimensional depth map. The data communication unit 12 may receive the two-dimensional depth map via wired connection, wireless connection, or any possible transmission technology to transmit data. The path planning function of the present invention can identify whether obstacles O1 and O2 exist and probable location of the obstacles O1 and O2 relative to the navigation device 10, so as to determine a steering direction and a steering speed for preventing the navigation device 10 from colliding with the obstacles O1 and O2.

Figure 3:
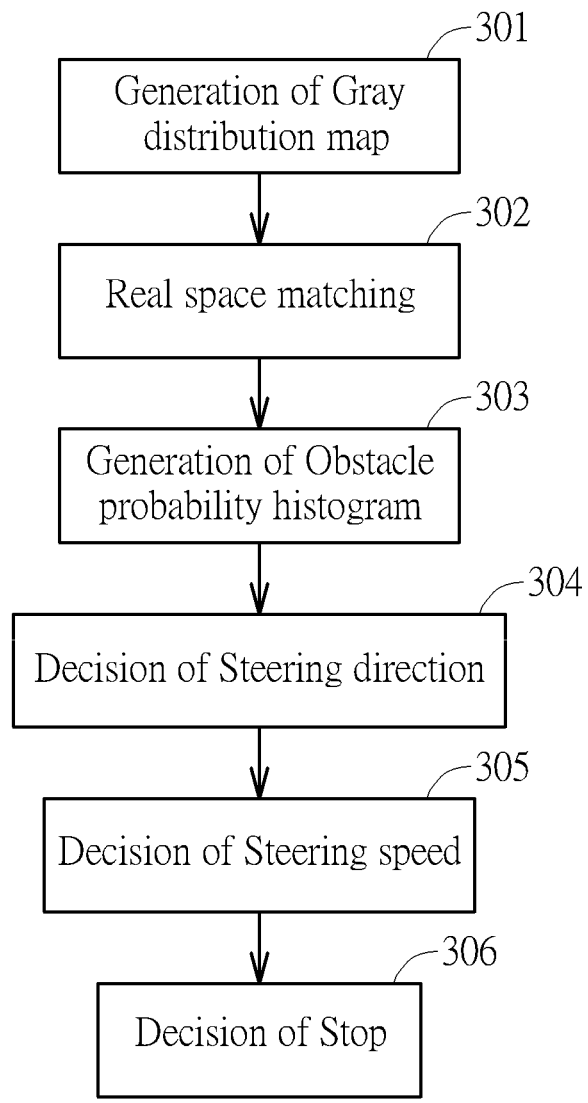
FIG. 3 is a plot diagram of the path planning function according to the embodiment of the present invention.
Figure 4:
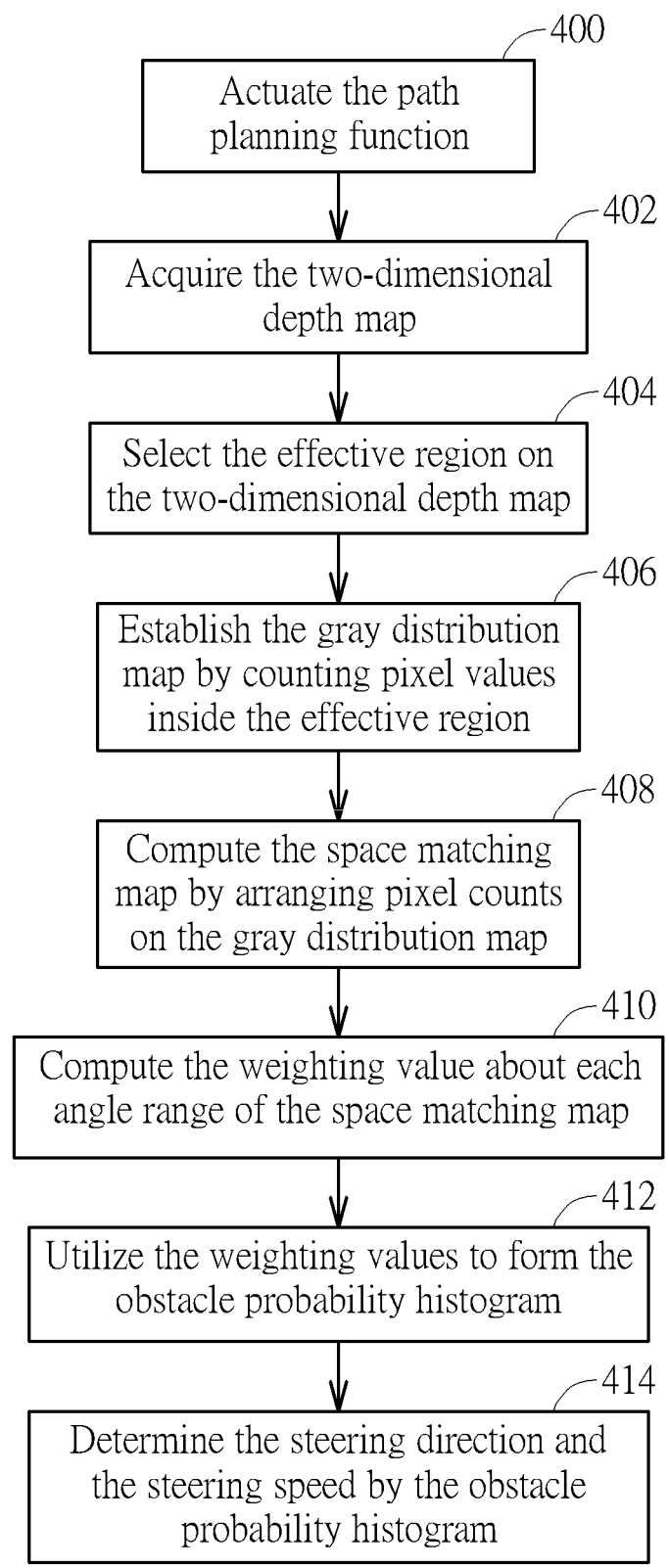
FIG. 4 is a flow chart of a path planning method according to the embodiment of the present invention.
Figure 5:
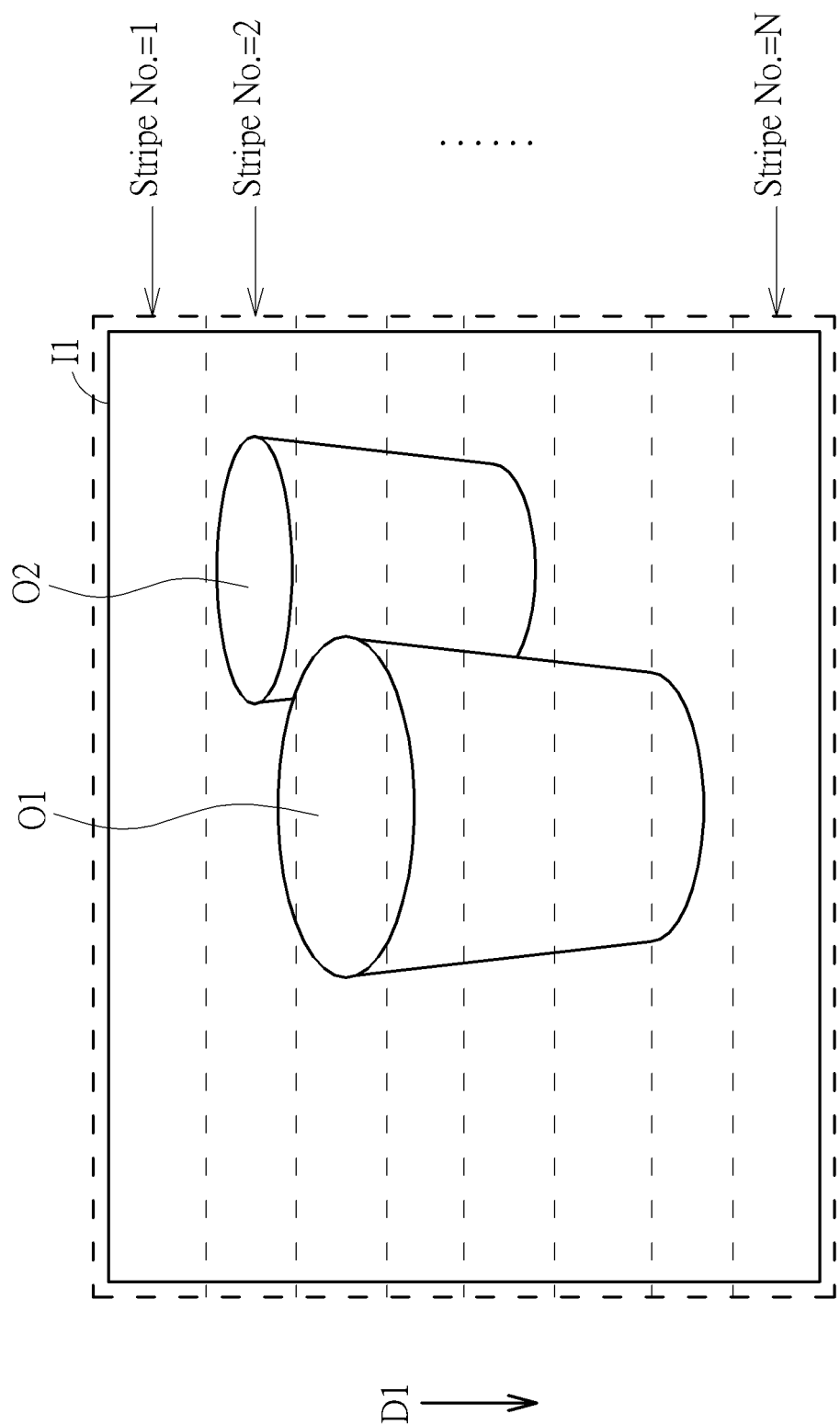
FIG. 5 and FIG. 6 are diagrams of the two-dimensional depth map divided into a plurality of stripes according to the embodiment of the present invention.
Figure 6:
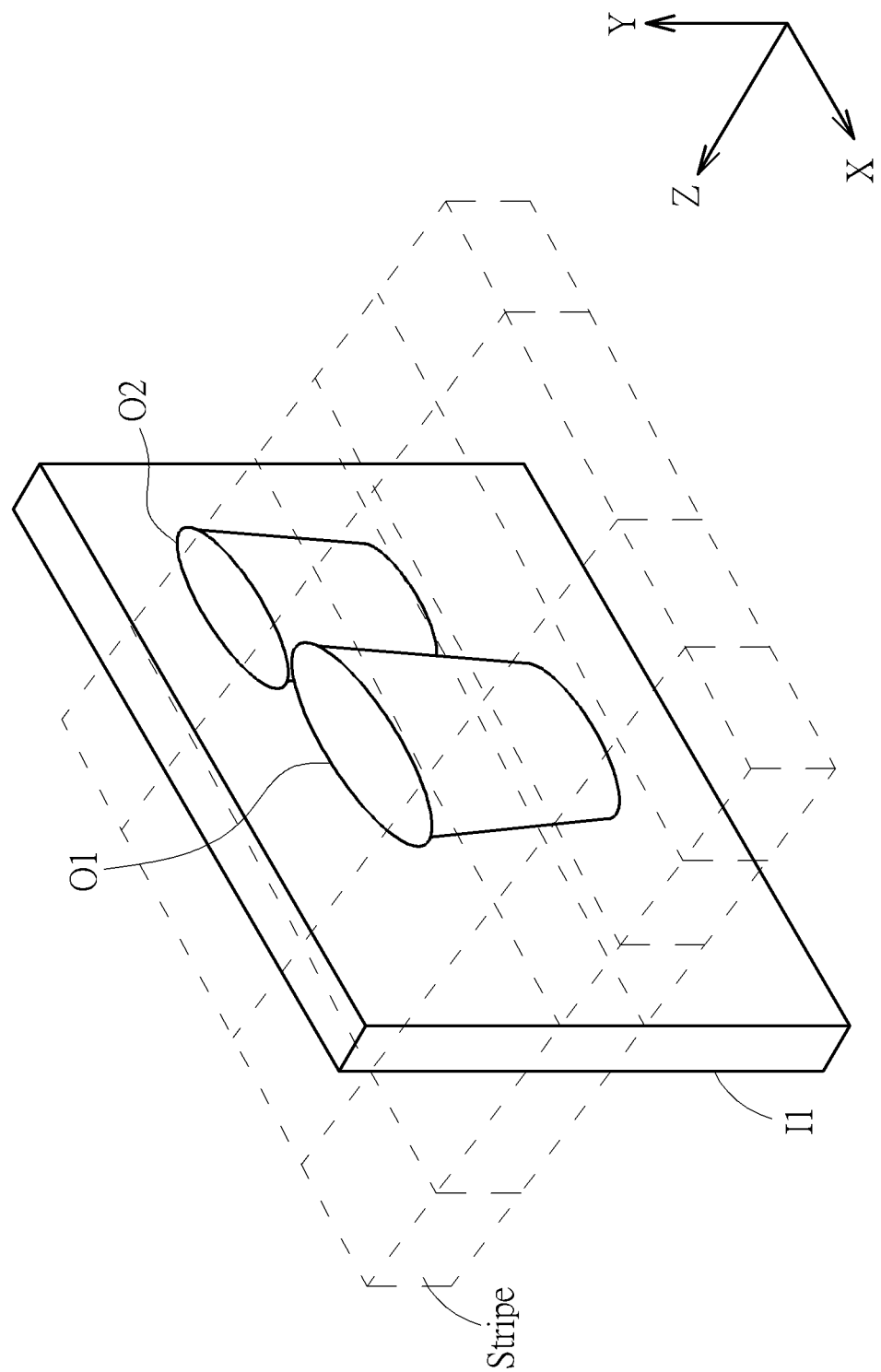
Figure 7:
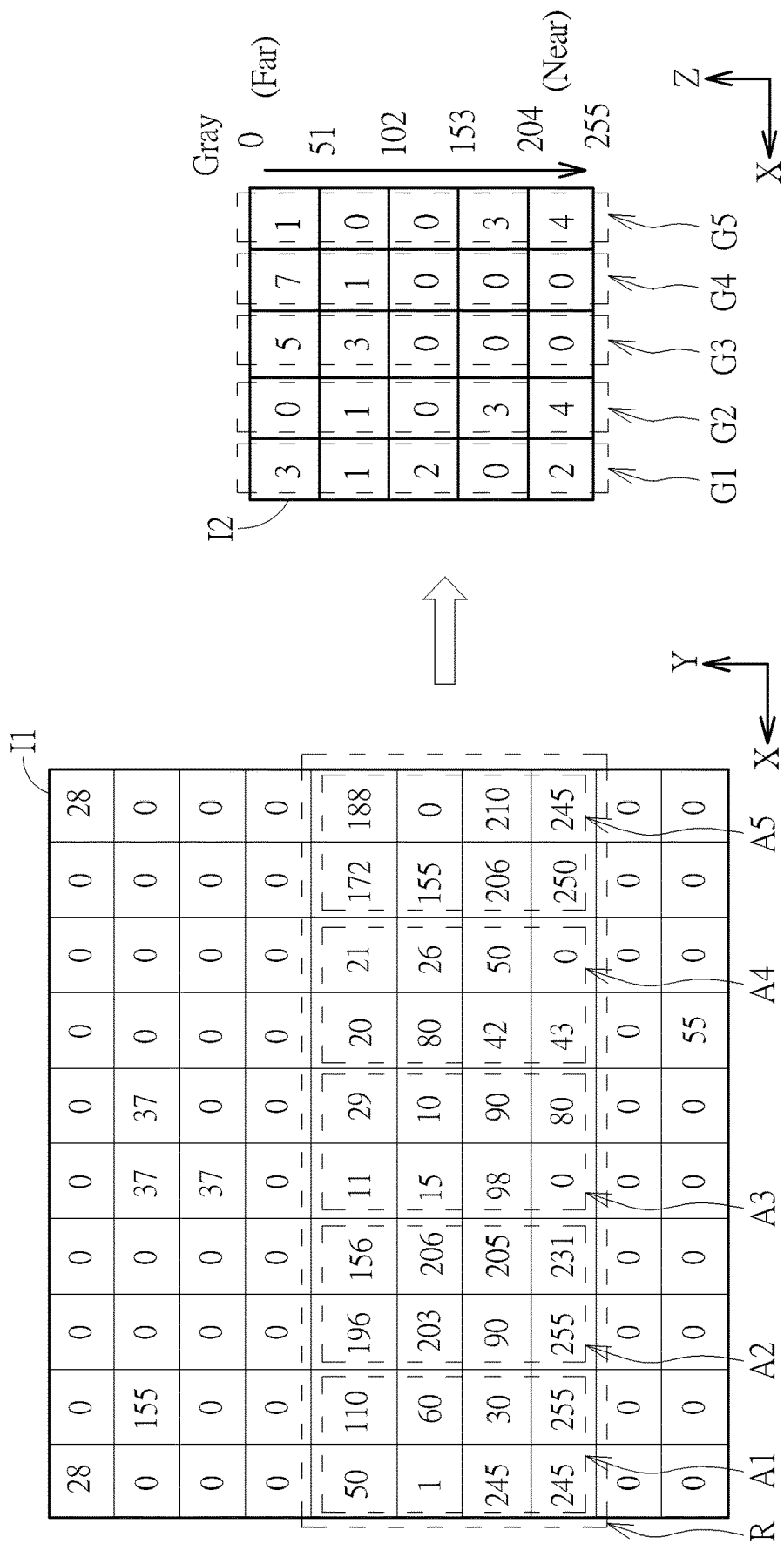
FIG. 7 is a diagram of showing the two-dimensional depth map transformed into a gray distribution map according to the embodiment of the present invention.
Figure 9:
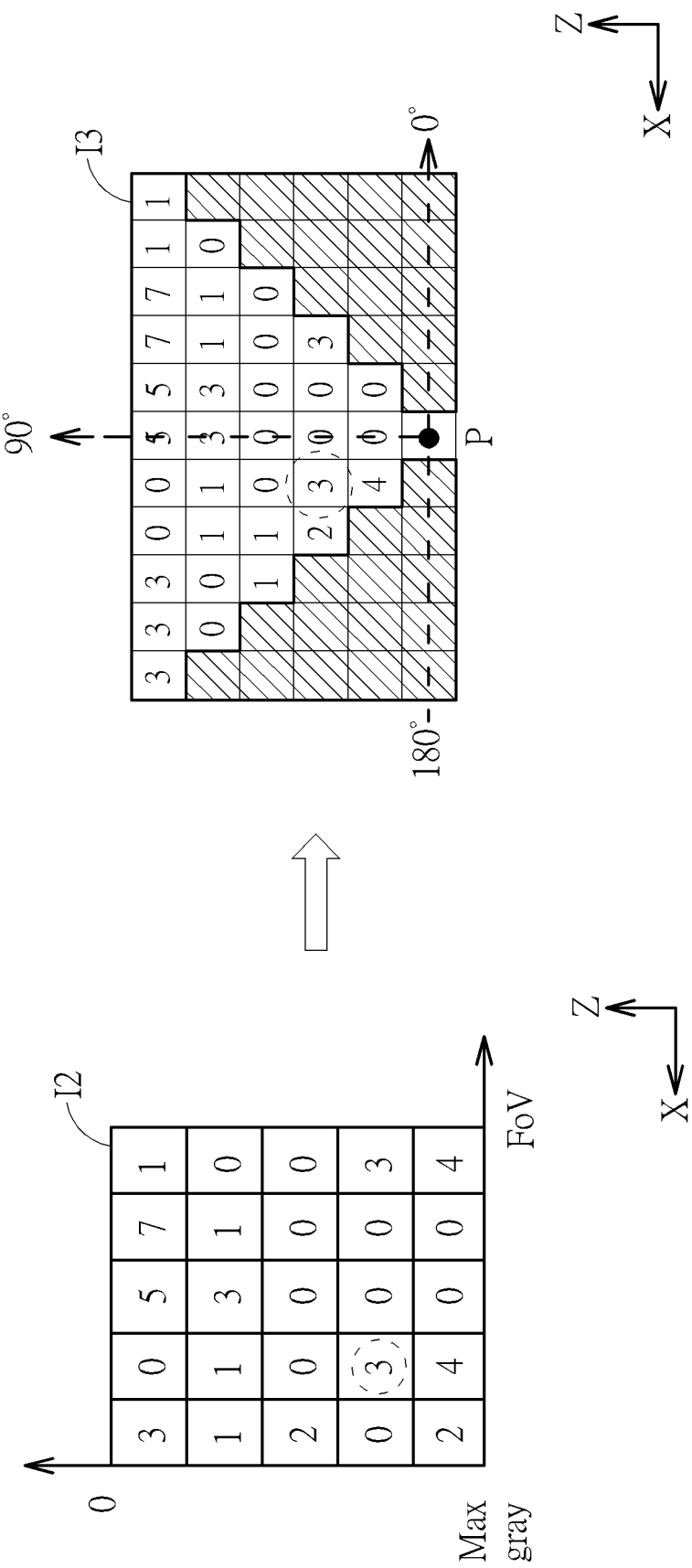
Figure 10:
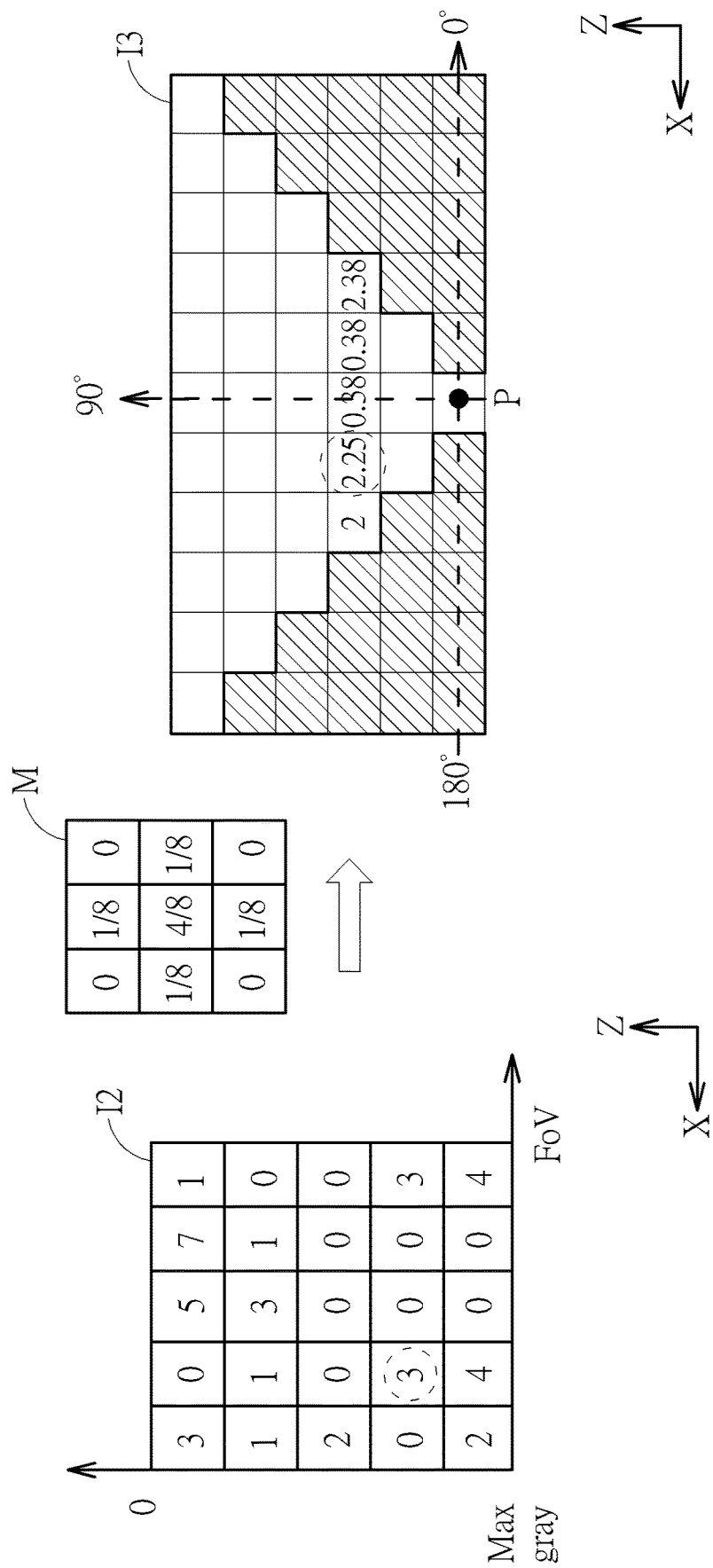
Figure 11:
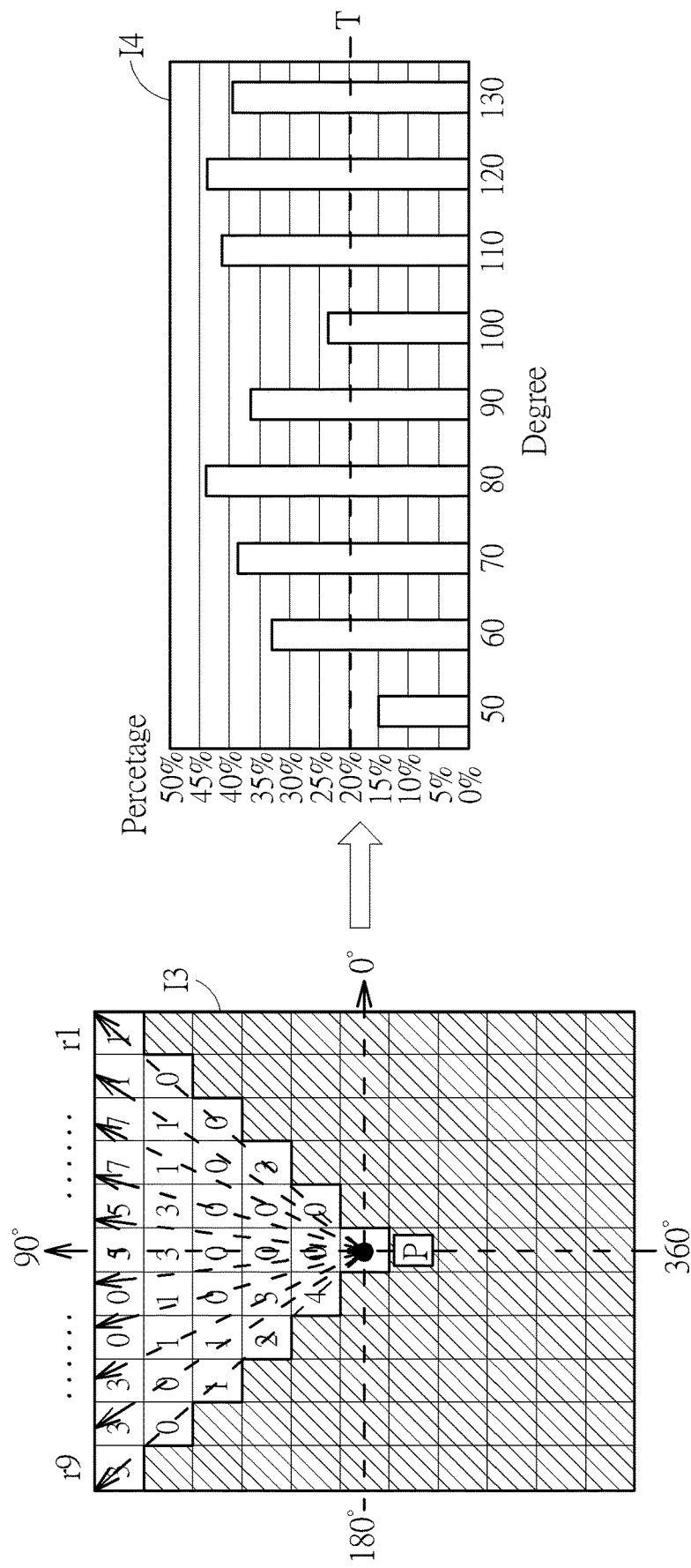
FIG. 11 is a diagram of showing the space matching map transformed into an obstacle probability histogram according to the embodiment of the present invention.

Please refer to FIG. 3 to FIG. 11. FIG. 3 is a plot diagram of the path planning function according to the embodiment of the present invention. FIG. 4 is a flow chart of a path planning method according to the embodiment of the present invention. FIG. 5 and FIG. 6 are diagrams of the two-dimensional depth map divided into a plurality of stripes according to the embodiment of the present invention. FIG. 7 is a diagram of showing the two-dimensional depth map transformed into a gray distribution map according to the embodiment of the present invention. FIG. 8 to FIG. 10 respectively are diagrams of showing the gray distribution map transformed into a space matching map according to different embodiments of the present invention. FIG. 11 is a diagram of showing the space matching map transformed into an obstacle probability histogram according to the embodiment of the present invention.

The two-dimensional depth map I1 is a planar image set in X-Y plane, the obstacle O1 is close to the observer (such like the navigation device 10), the obstacle O2 is far from the observer, and spatial relation between the obstacle O1 and the obstacle O2 can be interpreted by its gray level of patterns on the two-dimensional depth map I1. In this embodiment, the obstacle O1 close to the observer can have large-scale gray level, the obstacle O2 far from the observer can have small-scale gray level; however, another possible embodiment may set the obstacle O1 having the small-scale gray level and the obstacle O2 having the large-scale gray level, which depend on design demand. For determining a positive path and a negative path by the two-dimensional depth map I1, the two-dimensional depth map I1 can be transformed into the gray distribution map I2 via statistics of pixel values on the two-dimensional depth map I1 (Step 301), the gray distribution map I2 is set in X-Z plane, pixel counts with high gray level are piled on a side of the gray distribution map I2, and pixel counts with low gray level are piled on an opposite side of the gray distribution map I2. The pixel value with high gray level may represent high existential probability of the obstacle obstructing the planning path, and further simultaneously represent a nearest probable distance between the obstacle and the navigation device 10. In this embodiment, the pixel value means a gray level of each pixel, and the pixel count means an amount of a gray level range preset in accordance with design demand.

The gray distribution map I2 is a matrix and does not conform to a fan-shaped field of view of the data communication unit 12, so that the gray distribution map I2 can be transformed into the space matching map I3 (Step 302) for matching the field of view. Distribution of pixel counts on the space matching map I3 is similar to a fan-shaped form conforming to the field of view of the data communication unit 12, the space matching map I3 can be divided into a plurality of angle ranges, pixel counts on each of the plurality of angle ranges are computed to acquire a weighting value (which can be viewed as a kind of the existential probability) of the said angle range, and the weighting values of the plurality of angle ranges can be illustrated as the obstacle probability histogram I4 (Step 303).

A target Δ can be put on the obstacle probability histogram 14 according to its location inside the monitoring space. The target Δ may be located on one of the plurality of angle ranges on the obstacle probability histogram I4. The head of columns (which represents percentage of the weighting value) on the obstacle probability histogram I4 can be connected to form a curve, and the curve having a cavity and a non-cavity compared with the target Δ to determine the steering direction and the steering speed of the navigation device 10 (Steps 304 and 305). Comparison between the target Δ and the curve is further used to stop moving the navigation device 10 (Step 306), however the path planning function can execute commands of huge rotation or inverse turn to provide the navigation device 10 with capability of escaping from the obstacle.

As shown in FIG. 4 to FIG. 11, steps 400 and 402 are executed to actuate the path planning function, and the two-dimensional depth map I1 is acquired by optical sensing technique. Then, steps 404 and 406 are executed to select an effective region R on the two-dimensional depth map I1, and count the pixel values inside the effective region R to establish the gray distribution map I2. In the embodiment, the two-dimensional depth map I1 can be divided into a plurality of stripes along a specific direction D1. Each of the stripes No. 1~N can be represented as the effective region R, which is transformed into the gray distribution map I2 by statistics of the pixel values. For example, the effective region R is divided into a plurality of analyzed areas A1, A2, A3, A4 and A5. Each analyzed area can be transformed into a gray interval G1, G2, G3, G4 or G5 of the gray distribution map I2. The analyzed area A1 has eight pixels, the eight pixels are classified in accordance with the pixel value and predetermined gray value ranges, such as the gray value range 0~50, the gray value range 51~101, the gray value range 102~152, the gray value range 153~203, and the gray value range 204~255.

Then, a classifying result of the analyzed area A1 is arranged into the gray interval G1 sequentially along setting of the predetermined gray value range, which means a summation of the pixel counts inside the gray interval G1 is equal to an amount of the pixel inside the analyzed area A1. Relation between the analyzed area A2 and the gray interval G2, the analyzed area A3 and the gray interval G3, the analyzed area A4 and the gray interval G4, and the analyzed area A5 and the gray interval G5 are the same. Therefore, the gray distribution map I2 can be formed by merging the gray intervals G1-G5.

Step 408 is executed to compute the space matching map I3 by arranging the pixel counts on the gray distribution map I2. As mentioned above, the gray distribution map I2 is a matrix, the space matching map I3 is similar to the fan-shaped form, the pixel counts on each row of the gray distribution map I2 is redistributed along another specific direction D2 in accordance with a vision depth of a viewable range (which can be the fan-shaped FoV shown in FIG. 8) on the space matching map I3. It should be mentioned that a quantity of grids on the row and the column of the gray distribution map I2 and the space matching map I3 are variable, widths and lengths of the gray distribution map I2 and the space matching map I3 can be the same or different from each other, which depend on design demand. Therefore, the row close to a reference point P of the space matching map I3 is shorter than the row far from the reference point P, and the rows on the gray distribution map I2 have the same length, so that the rows on the gray distribution map I2 should be transformed by some computation to match with the space matching map I3.

As shown in FIG. 9, a grid (which is marked by the dotted line) on the space matching map I3 is selected, a straight distance from the selected grid to the reference point P is computed, the straight distance is compared with an image height of the space matching map I3 to gain a ratio, and one of the rows on the gray distribution map I2 can be chosen according to the said ratio; that is to say, the vision depth of each grid on the space matching map I3 is proportional to the gray interval height of a corresponding pixel count on the gray distribution map I2. Then, location of the selected grid relative to the sited row can be used to gain another ratio, the corresponding pixel count on the chosen row can be picked up from the gray distribution map I2 in accordance with the foresaid ratio, and the picked pixel count can be filled in the selected grid. All the grids within the field of view (FoV) are filled by the above-mentioned computation to complete transformation between the gray distribution map I2 and the space matching map I3.

Besides, a predetermined mask M further can be used to transform the gray distribution map I2 into the space matching map I3. The predetermined mask M has a central weight and a plurality of adjacent weights, the central weight (such as 4/8 shown in FIG. 10) is greater than the plurality of adjacent weights (such as 1/8 and 0 shown in FIG. 10). Values of the central weight and the adjacent weight are not limited to the above-mentioned example, which depends on design demand. While the grid on the space matching map I3 is selected, the pixel count on the gray distribution map I2 having the location related to the selected grid is searched accordingly, the searched pixel count is multiplied by the central weight, the adjacent pixel counts around the searched pixel count are multiplied by the adjacent weights, and an average of foresaid products can be computed and filled in the selected grid. If any of the adjacent pixel counts on the gray distribution map I2 do not exist, the inexistent adjacent pixel count can be replaced by zero or value of the searched pixel count optionally.

Then, steps 410 and 412 are executed to compute the weighting value about each angle range of the space matching map I3, and all the weighting values of the space matching map I3 can be used to form the obstacle probability histogram I4. The weighting value of the obstacle within each angle range is computed in accordance with a product of the pixel counts inside the angle range and the distance from each pixel count to the reference point P, the pixel count with high level and close to the reference point P can be under the impression that the related angle range may have the obstacle or obstacle collision is imminent, the pixel count with low level and far from the reference point P can be under the impression that the related angle range may be cleared without the obstacle or the obstacle is distant, so that the weighting value of the obstacle is inversely proportional to the distance from each pixel count to the reference point P, and each of the weighting value represents the existential probability of the obstacle within the corresponding angle range and the probable distance between the obstacle and the navigation device.

As shown in FIG. 11, the space matching map I3 can be divided into a plurality of angle ranges r1~r9. The FoV of the space matching map I3 may be ranged between 45°~135°, and each angle range can be 10 degrees. An amount of the angle range and degrees of the FoV and the angle range are not limited to the above-mentioned example, which depend on design demand. The weighting value of the angle ranges r1~r9 are computed and illustrated in the obstacle probability histogram I4, the head of the weighting value can be optionally connected to form the curve, a predefined threshold T can be set on the obstacle probability histogram I4, the angle range with the weighting value lower than the predefined threshold T is represented as the positive path may be existed in this angle range, and the angle range with the weighting value greater than the predefined threshold T is represented as the rejected negative path. Final, step 414 is executed to utilize the obstacle probability histogram I4 to determine the steering direction and the steering speed of the navigation device 10.

As the navigation device 10 is an autonomous vehicle, the autonomous vehicle moves on the planar ground without ascending and descending, the obstacle probability histogram I4 can be used to guide the navigation device 10 for making a turn or speeding up and slowing down. As the navigation device 10 is an unmanned aerial vehicle (UAV), the single obstacle probability histogram I4 is insufficient to guide the UAV for lifting and landing, and an obstacle probability distribution map can be merged by several obstacle probability histograms and utilized to guide the lifting and landing of the UAV.

Figure 12:
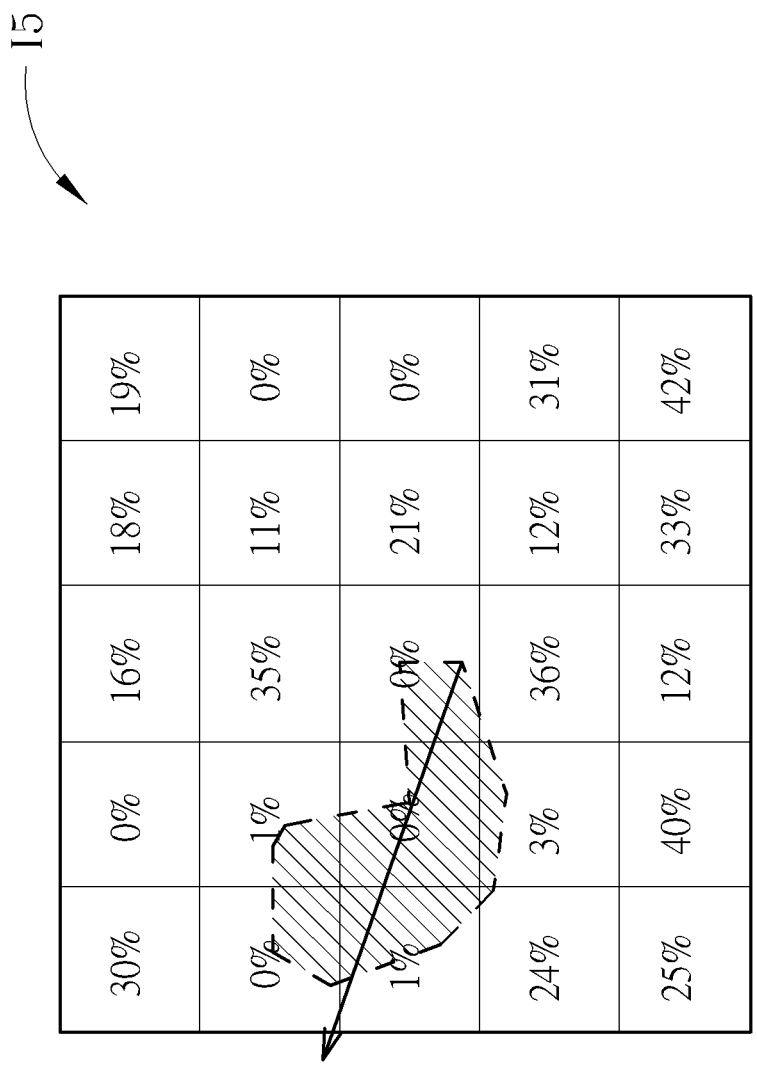
FIG. 12 is a diagram of an obstacle probability distribution map applied for the navigation device according to the embodiment of the present invention.

Please refer to FIG. 3 to FIG. 12. FIG. 12 is a diagram of an obstacle probability distribution map applied for the navigation device 10 according to the embodiment of the present invention. The two-dimensional depth map I1 is divided into the plurality of stripes, the obstacle probability histogram I4 is transformed from one of the plurality of stripes, so that the path planning method can acquire N number of the obstacle probability histograms I4 respectively transformed by the stripe No. 1~N of the two-dimensional depth map I1. The N number of the obstacle probability histograms I4 can be merged according to order to form the 2-dimensional obstacle probability distribution map I5, the grids (which points toward a specific angle range) on the obstacle probability distribution map I5 having the weighting value lower than the predefined threshold T can be interpreted as the positive path, the other grids (which points toward a designated specific angle) having the weighting value higher than the predefined threshold T can be interpreted as the negative path, the steering direction and the steering angle of depression and elevation can be decided accordingly, and a proposed route (which is drawn by a dotted pattern) can be exhibited in space.

Figure 13:
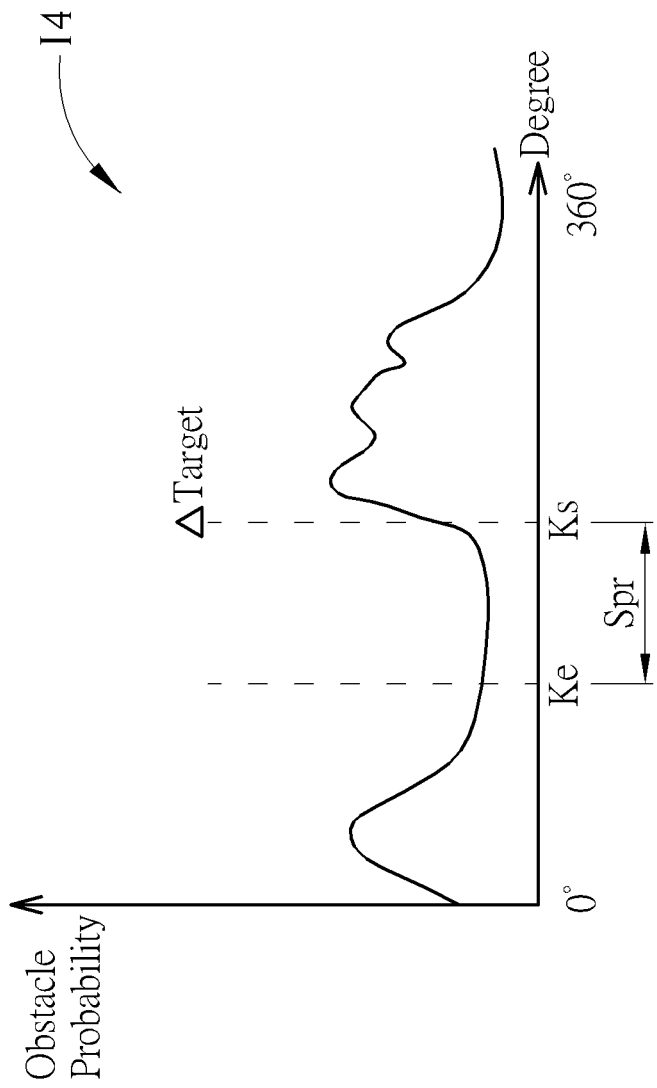
FIG. 13 is a diagram of showing the target in the cavity on the curve of the obstacle probability histogram according to the embodiment of the present invention.
Figure 14:
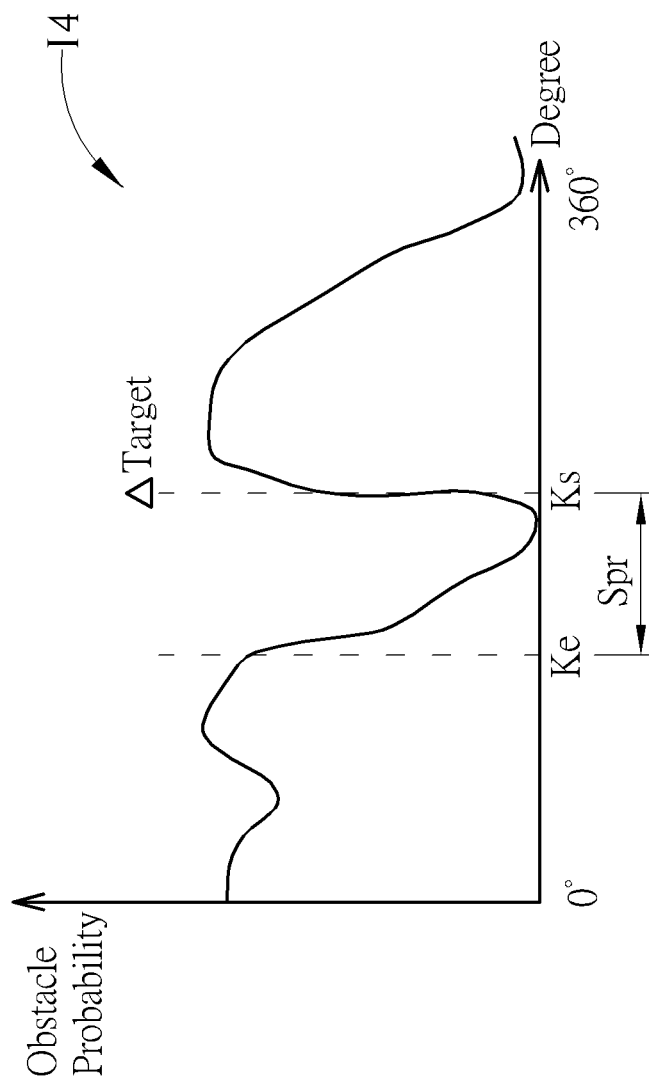
FIG. 14 is a diagram of showing the target in the non-cavity on the curve of the obstacle probability histogram according to the embodiment of the present invention.
Figure 15:
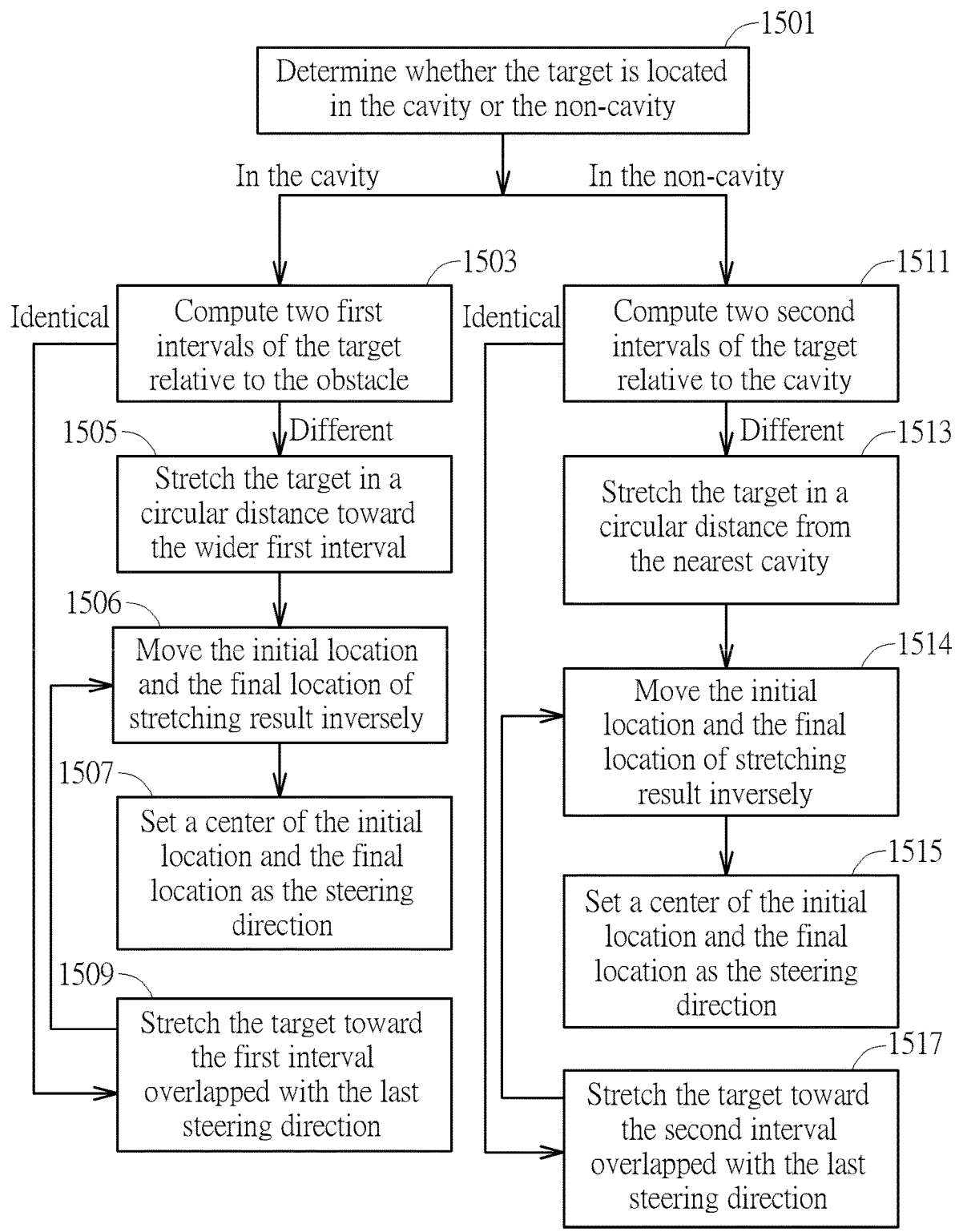
FIG. 15 is a flow chart of deciding the steering direction according to the embodiment of the present invention.
Figure 16:
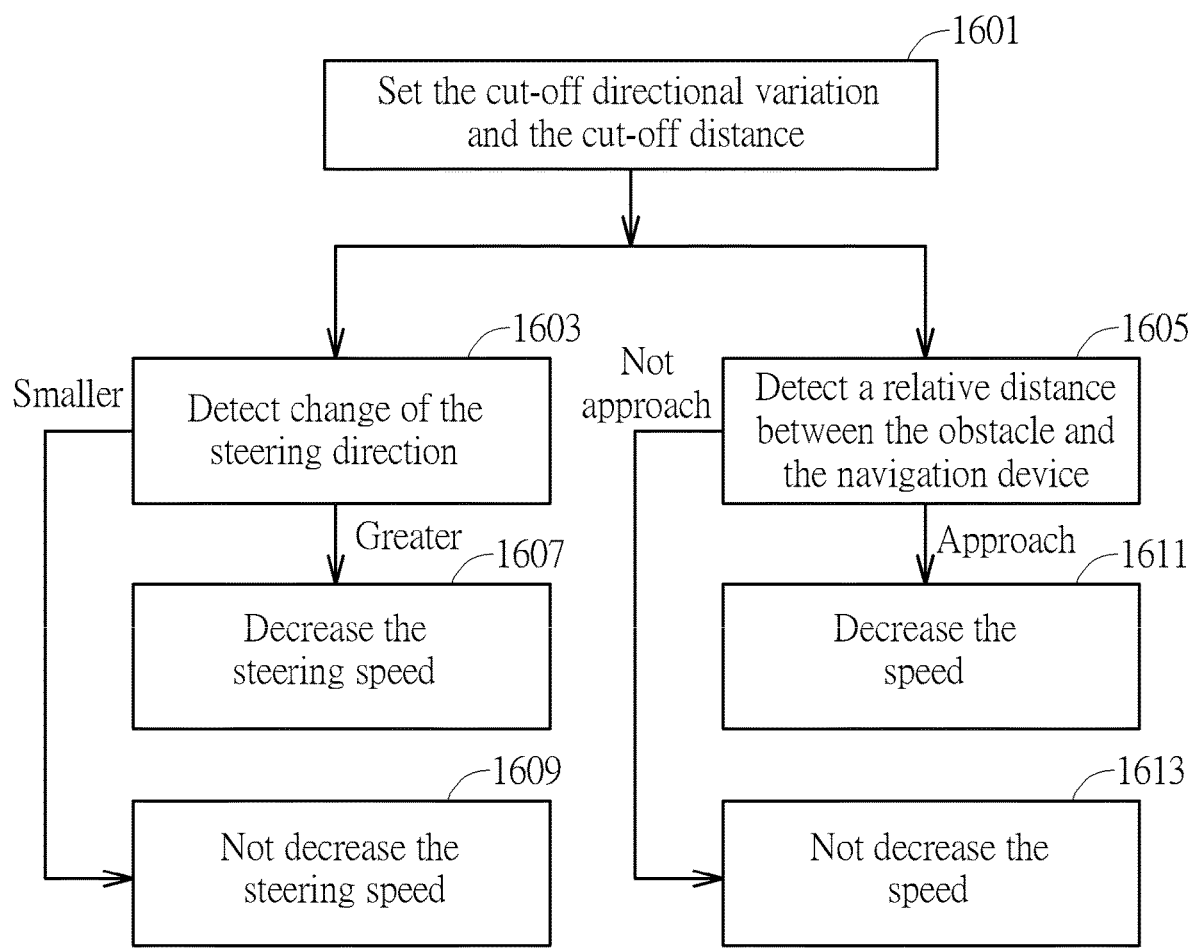
FIG. 16 is a flow chart of deciding the steering speed according to the embodiment of the present invention.
Figure 17:
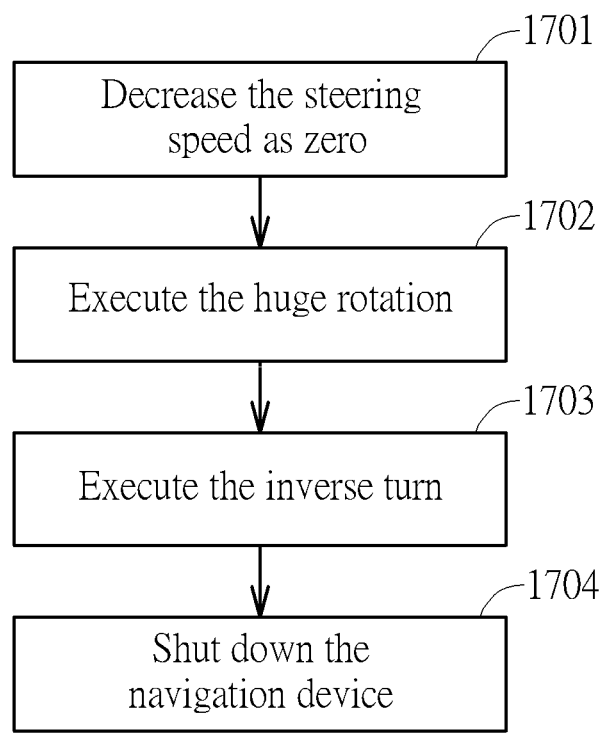
FIG. 17 is a flow chart of deciding stop and capability of escaping according to the embodiment of the present invention.
Figure 20:
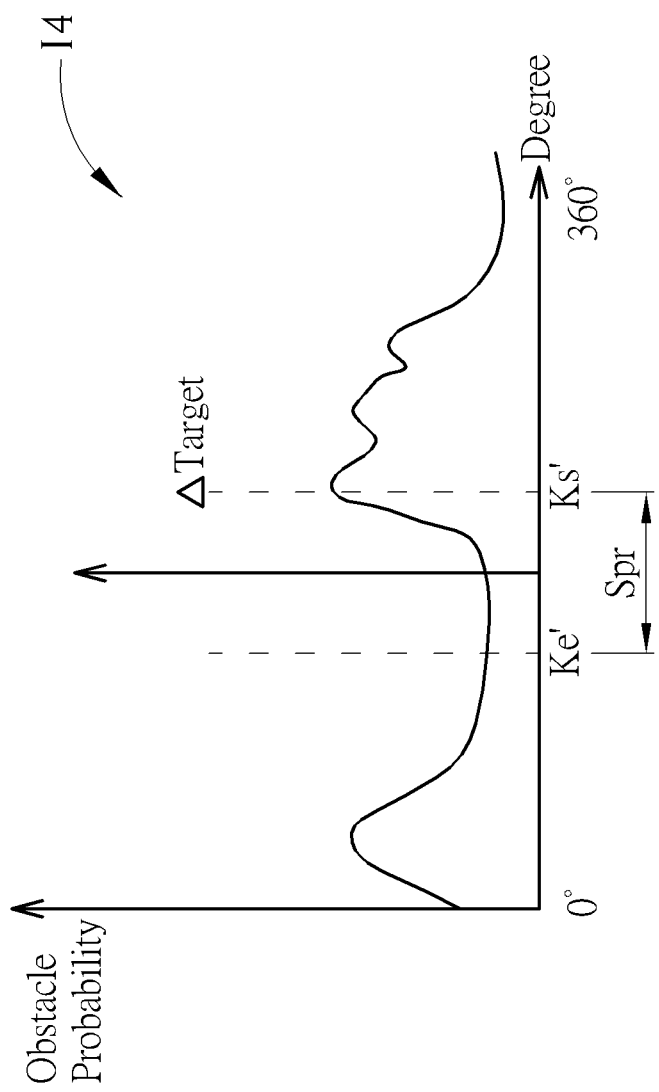
FIG. 20 is another diagram of showing the target in the cavity on the curve of the obstacle probability histogram according to the embodiment of the present invention.

Please refer to FIG. 13 to FIG. 17 and FIG. 20. FIG. 13 is a diagram of showing the target in the cavity on the curve of the obstacle probability histogram I4 according to the embodiment of the present invention. FIG. 14 is a diagram of showing the target in the non-cavity on the curve of the obstacle probability histogram I4 according to the embodiment of the present invention. FIG. 15 is a flow chart of deciding the steering direction according to the embodiment of the present invention. FIG. 16 is a flow chart of deciding the steering speed according to the embodiment of the present invention. FIG. 17 is a flow chart of deciding stop and capability of escaping according to the embodiment of the present invention. FIG. 20 is another diagram of showing the target in the cavity on the curve of the obstacle probability histogram I4 according to the embodiment of the present invention.

Degree distribution of the obstacle probability histograms I4 shown in FIG. 13, FIG. 14 and FIG. 20 are broadened to 0~360 degrees optionally to detect whether the obstacle is located around the navigation device 10. For deciding the steering direction, step 1501 is executed to determine whether the target Δ is located in the cavity or the non-cavity on the obstacle probability histogram I4. When the target Δ is located in the cavity, as shown in FIG. 13, step 1503 is executed to compute first intervals of opposite sides of the target Δ relative to the adjacent non-cavities. A wider first interval of the two first intervals may represent a spacious way by the target Δ, and the other first interval may represent a narrow way by the target Δ. While the first intervals are different, steps 1505, 1506 and 1507 are executed to stretch virtual motion of the target Δ in a circular distance Spr toward the wider first interval, an initial location (such as a right-side dotted line shown in FIG. 13) is set as a symbol ks and a final location (such as a left-side dotted line shown in FIG. 13) is set as a symbol ke, so as to move the initial location ks and the final location ke backward to an amending distance Spr/2 (the said backward amending direction is inverse to a stretching direction from the symbol ks to the symbol ke), and to set a location of (ks+ke)/2 as the steering direction. In step 1506, the initial location and the final location are suspended (being not moved backward) when ones of the symbols ks' and ke' is overlapped with a boundary between the cavity and the non-cavity (which can be shown in FIG. 20), an interval between the symbols ks' and ke' is kept to the circular distance Spr, and the location of (ks'+ke')/2 can be set as the steering direction. While the first intervals are identical, step 1509 is executed to stretch the virtual motion of the target Δ toward the first interval which is overlapped with the last steering direction of the navigation device 10.

When the target Δ is located in the non-cavity, as shown in FIG. 14, step 1511 is executed to compute second intervals of opposite sides of the target Δ relative to the adjacent cavities. The narrow second interval of the two second intervals may represent a way for the nearest cavity, the wider second interval of the two second intervals may represent a way for the farthest cavity, and the cavity which is nearest to the target Δ can be selected and the virtual motion can be stretched to the said nearest cavity; for example, While the second intervals are different, steps 1513, 1514 and 1515 are executed to stretch the virtual motion of the target Δ in the circular distance Spr from an edge of the selected cavity, the initial location and the final location of the virtual motion are respectively set as ks and ke, so as to move the initial location ks and the final location ke backward to the amending distance Spr/2, and to set the location of (ks+ke)/2 as the steering direction. In step 1514, the initial location and the final location are suspended (being not moved backward) when ones of the symbols ks and ke is overlapped with the boundary between the cavity and the non-cavity, the interval between the symbols ks and ke is kept to the circular distance Spr, and the location of (ks+ke)/2 can be set as the steering direction. While the second intervals are identical, step 1517 is executed to stretch the virtual motion of the target Δ toward the second interval which is overlapped with the last steering direction of the navigation device 10.

As shown in FIG. 16, for deciding the steering speed, step 1601 is executed to set a cut-off directional variation and a cut-off distance. The cut-off directional variation represents a change of the steering direction by determination of the obstacle probability distribution map I5, and the cut-off distance represents a predefined minimal distance between the obstacle and the navigation device 10. Then, steps 1603 and 1605 are executed to detect the change of the steering direction and a relative distance from the navigation device 10 to the obstacle. When the navigation device 10 makes a big turn and the change of the steering direction is greater than the cut-off directional variation, step 1607 is executed to decrease the steering speed for preferred stability; when the said change is smaller than the cut-off directional variation, the navigation device 10 can be still moved to the changed direction, and step 1609 is executed to remain the current steering speed or be increased to maximal speed. Further, when the navigation device 10 is approached to the cut-off distance, traffic accident may be generated soon, and step 1611 is executed to decrease the speed; step 1613 can be executed to increase or remain the current speed when the navigation device 10 is not approached to the cut-off distance.

As shown in FIG. 17, the whole weighting values on the obstacle probability histogram I4 being greater than the predefined threshold T or the target Δ being located in the non-cavity without shifting to the cavity can be interpreted as all directions in space are obstructed, step 1701 may be executed to decrease the steering speed of the navigation device 10 as zero. In a suspending period of the navigation device 10, steps 1703 and 1705 are executed to execute the huge rotation and the inverse turn for detouring; after the huge rotation and the inverse turn are tried several times and ineffective within the suspending period, step 1707 can be executed to shut down the navigation device 10.

Figure 18:
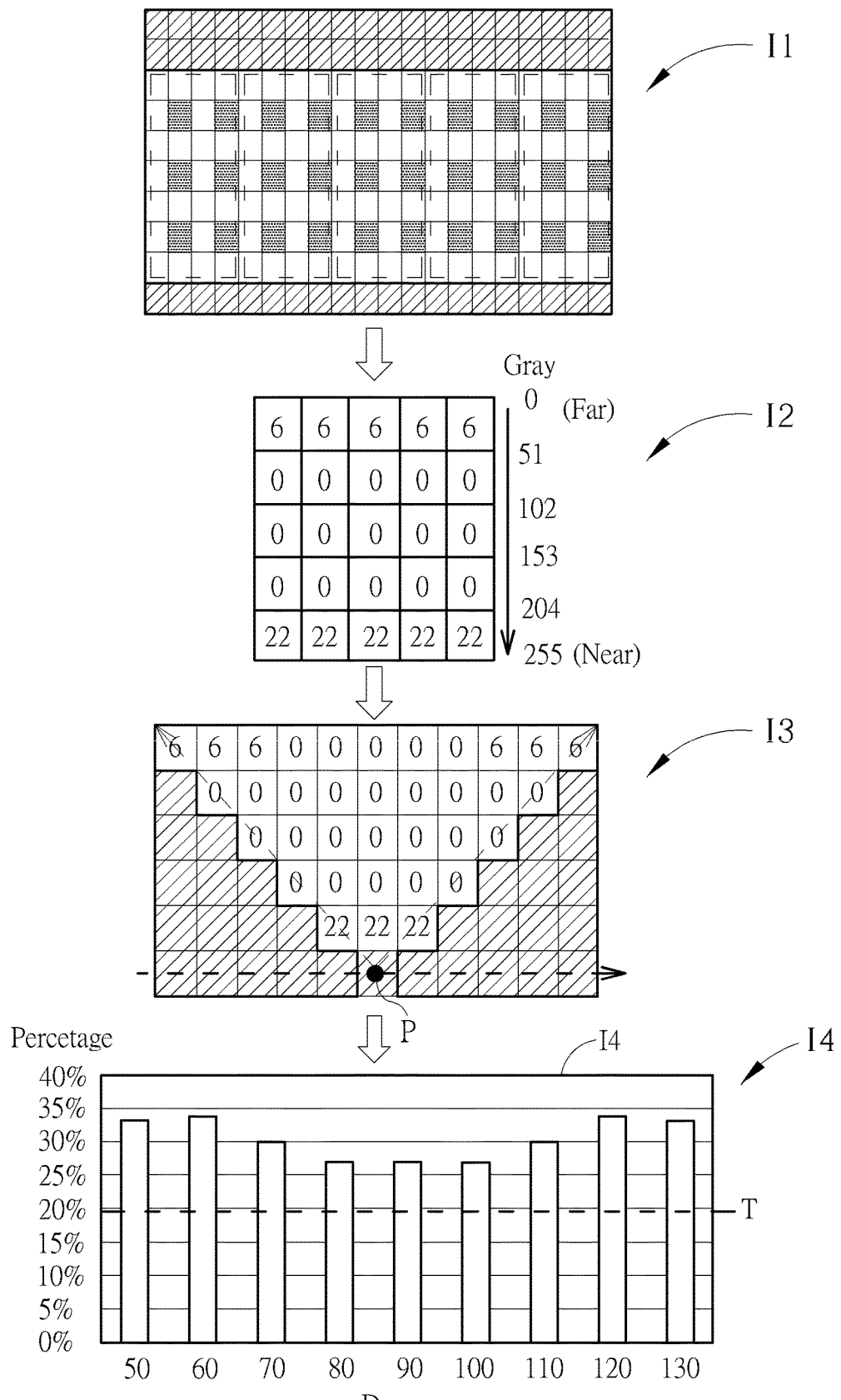
FIG. 18 and FIG. 19 respectively are application diagrams of the path planning method in different situations according to the embodiment of the present invention.
Figure 19:
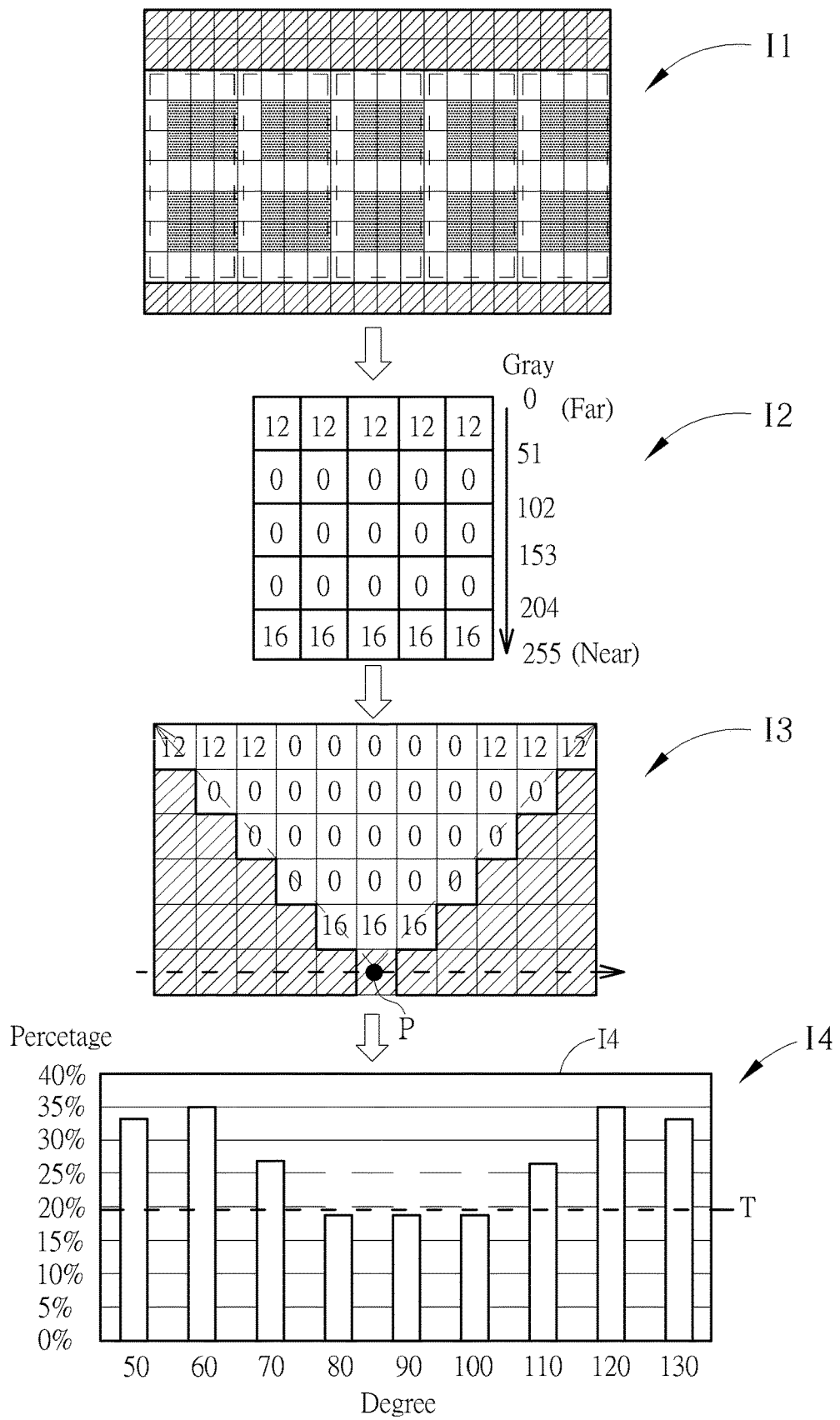

Please refer to FIG. 18 and FIG. 19. FIG. 18 and FIG. 19 respectively are application diagrams of the path planning method in different situations according to the embodiment of the present invention. As shown in FIG. 18, the obstacle is a dense mesh, the dense mesh depth map I1 is generated accordingly, the dense mesh space matching map I3 is transformed by the dense mesh depth mat I1, the pixel counts of grids on the first row nearest the reference point P on the dense mesh space matching map I3 are large (being increased due to the dense mesh), and the weighting values about the whole field of view computed by the pixel counts on each angle range of the dense mesh space matching map I3 are fully greater than the predefined threshold T on the obstacle probability histogram I4, so that the path planning method determines that all of forward paths are obstructed, and the navigation device 10 can be suspended away from the obstacle owing to a high coverage ratio of the dense mesh.

As shown in FIG. 19, the obstacle is a loose mesh, the loose mesh depth map I1 is generated accordingly, the loose mesh space matching map I3 is transformed by the loose mesh depth mat I1, the pixel counts of grids on the first row nearest the reference point P on the dense mesh space matching map I3 are lower (being not increased due to the loose mesh), and the weighting values about parts of the FoV computed by the pixel counts on each angle range of the dense mesh space matching map I3 are lower than the predefined threshold T on the obstacle probability histogram I4. The positive path can be decided in accordance with the angle ranges having the lower weighting value, the navigation device 10 still moves toward the obstacle owing to a low coverage ratio of the loose mesh. Until the navigation device 10 approaches the loose mesh, the pixel counts on the first row are varied and the related weighting values are increased to be greater than the predefined threshold T, the path planning method detects the nearest loose mesh and the navigation device 10 is suspended accordingly. Variation of the coverage ratio is proportional to the weighting value, which means the high coverage ratio corresponds to the large weighting value and small passing possibility, and the low coverage ratio corresponds to the small weighting value and great passing possibility.

In conclusion, the navigation device of the present invention has a tracking system, a depth sensing system and a control system, the tracking system analyzes orientation of the target to provide a target angle and a target distance relative to the navigation device, and the depth sensing system generates the depth map for executing the path planning method. The path planning method of the present invention can acquire the steering direction and the steering speed by computation of the target angle, the target distance and the depth map, so as to identify whether the obstacle exists in space and plan the positive path in accordance with the existential probability of an obstacle within the whole angle ranges in space and the probable distance between the obstacle and the navigation device, and the control system can move the navigation device to steer clear of the obstacle. It should be further mentioned that the path planning method can distinguish between the dense mesh and the loose mesh, the navigation device can be stopped moving when detecting the dense mesh far ahead, and further can move on when detecting the loose mesh till approaching the obstacle. In the decision of steering direction, the path planning method can have priority in following the last steering direction to avoid the navigation device from frequent turning, and the path planning method further can have priority in moving toward roomy space even though the decided steering direction may not directly point the target.

The depth sensing system may have the data communication unit and the built-in image capturing unit, the built-in image capturing unit captures the monitoring image, the data communication unit receives and transmits the monitoring image to the computing processor; further, the external image capturing unit may be separated from the depth sensing system, the depth sensing system can utilize the data communication unit to establish a communication channel with the external image capturing unit, and the computing processor can analyze the depth map from the external image capturing unit for determining the steering direction and the steering speed. The navigation device with the path planning function can be applied to the autonomous vehicle, the path planning function utilizes one of the stripes on the two-dimensional depth map to execute analysis of the two-dimensional gray distribution map and space matching map, so as to make a policy decision of the one-dimensional obstacle probability, and the steering direction can be determined. The navigation device further can be applied to the UAV, the path planning function utilizes the stripes on the at least two-dimensional depth map to acquire the plurality of obstacle probability histograms, the plurality of obstacle probability histograms can be merged to form the two-dimensional obstacle probability distribution map, and the level steering direction and the steering angle of depression and elevation can be determined accordingly; for example, the depth map may be a three-dimensional depth map in accordance with navigation demand. Besides, the navigation device can be applied to a blind guiding apparatus, or can be applied to a virtual reality helmet because the user cannot look around by shelter of the helmet.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A path planning method applied to a navigation device, the path planning method comprising:
   acquiring a two-dimensional depth map;
   dividing an effective region on the two-dimensional depth map into a plurality of analyzed areas;
   classifying pixel values inside each analyzed area in accordance with a predetermined gray value range;
   arranging a classifying result into a gray interval along variation of the predetermined gray value range;
   forming a gray distribution map by merging gray intervals transformed from the plurality of analyzed areas, wherein a summation of pixel counts inside the gray interval is equal to an amount of the pixel values inside the corresponding analyzed area;
   computing a space matching map by arranging the pixel counts on the gray distribution map; and
   computing a weighting value about each angle range of the space matching map in accordance with a distance from location of a pixel count to a reference point of the space matching map, wherein the weighting value represents existential probability of an obstacle within the said angle range and a probable distance between the navigation device and the obstacle.

2. The path planning method of claim 1, wherein transforming the two-dimensional depth map into the gray distribution map comprises:
- selecting the effective region on the two-dimensional depth map; and
- counting the pixel values inside the effective region to establish the gray distribution map.

3. The path planning method of claim 1, wherein computing the space matching map by arranging the pixel counts on the gray distribution map is redistributing the pixel counts of the gray distribution map along a specific direction in accordance with a vision depth of a viewable range on the space matching map.

4. The path planning method of claim 1, wherein computing the space matching map by arranging the pixel counts on the gray distribution map comprises:
- selecting a grid on the space matching map;
- computing a distance from the selected grid to the reference point; and
- picking the pixel count on the gray distribution map in accordance with the computed distance to fill in the selected grid.

5. The path planning method of claim 4, wherein a row of elements of the gray distribution map is directly related to a corresponding element's distance from a reference point on the space matching map.

6. The path planning method of claim 1, wherein computing the space matching map by arranging the pixel counts on the gray distribution map comprises:
- selecting a grid on the space matching map;
- searching a corresponding pixel count on the gray distribution map related to the selected grid; and
- applying a predetermined mask onto the corresponding pixel count and adjacent pixel counts to acquire a computed value filled in the selected grid.

7. The path planning method of claim 6, wherein the predetermined mask comprises a central weight and a plurality of adjacent weights, the central weight is greater than the plurality of adjacent weights.

8. The path planning method of claim 1, wherein the existential probability of the obstacle is inversely proportional to the distance from each pixel count to the reference point.

9. The path planning method of claim 1, wherein the space matching map is divided into a plurality of angle ranges, the weighting value of the obstacle within each angle range is computed in accordance with a product of the pixel counts inside the said angle range and the distance from each pixel count to the reference point.

10. The path planning method of claim 9, wherein the weighting value of the plurality of angle ranges are utilized to form an obstacle probability histogram.

11. The path planning method of claim 10, wherein a predefined threshold is set on the obstacle probability histogram, the weighting value of a specific angle range lower than the predefined threshold represents the specific angle range is a positive path, and the weighting value of a designated specific angle range greater than the predefined threshold represents the designated angle range is a negative path.

12. The path planning method of claim 11, wherein when the obstacle is a dense mesh, the pixel counts of grids nearest the reference point are increased so that the gray distribution map has a great quantity of pixel counts with high gray level, and the path planning method determines the weighting value of the plurality of angle ranges are greater than the predefined threshold because variation of a coverage ratio of the dense mesh is proportional to the weighting value.

13. The path planning method of claim 11, wherein when the obstacle is a loose mesh, the pixel counts of grids nearest the reference point are decreased so that the gray distribution map has a small quantity of pixel counts with high gray level, and the path planning method determines a part of the weighting value of the plurality of angle ranges are lower than the predefined threshold for a positive path because variation of a coverage ratio of the loose mesh is proportional to the weighting value.

14. The path planning method of claim 1, wherein the two-dimensional depth map is divided into a plurality of stripes along a specific direction, and each of the plurality of stripes is transformed into a related obstacle probability histogram.

15. The path planning method of claim 14, wherein obstacle probability histograms of the plurality of stripes are used to determine a steering direction and a steering speed of the navigation device.

16. The path planning method of claim 1, further comprising:
- forming an obstacle probability histogram in accordance with the weighting value of angle ranges of the space matching map;
- determining whether a target related to the obstacle is located in a cavity or a non-cavity on the obstacle probability histogram; and
- stretching the target in accordance with a determining result to set a steering direction and a steering angle of depression and elevation of the navigation device.

17. The path planning method of claim 16, further comprising:
- setting a steering speed of the navigation device as zero for staying at a current position while the weighting value of the angle ranges are located in the non-cavity.

18. The path planning method of claim 17, further comprising:
- setting at least one of huge rotation and inverse turn; and
- executing the huge rotation or the inverse turn for the navigation device while the steering speed is set as zero.

19. The path planning method of claim 16, wherein while the target is located in the cavity, first intervals of opposite sides of the target relative to the non-cavity are computed, the target is stretched a circular distance toward a wider first interval, an initial location and a final location of stretched motion of the target are moved inversely, and a center of the moved initial location and the moved final location is represented as the steering direction.

20. The path planning method of claim 19, wherein while the first intervals are identical, the target is stretched toward a first interval overlapped with the last steering direction of the navigation device.

21. The path planning method of claim 16, wherein while the target is located in the non-cavity, second intervals of opposite sides of the target relative to the cavity are computed, the target is stretched a circular distance toward a narrow second interval, an initial location and a final location of stretched motion of the target are moved inversely, and a center of the moved initial location and the moved final location is represented as the steering direction.

22. The path planning method of claim 21, wherein while the second intervals are identical, the target is stretched toward a second interval overlapped with the last steering direction of the navigation device.

23. The path planning method of claim 16, wherein stretched motion of the target is suspended while the target is overlapped with a boundary between the cavity and the non-cavity.

24. The path planning method of claim 1, wherein the weighting value is analyzed to determine a steering direction and a steering speed of the navigation device, the path planning method further comprises:
setting a cut-off directional variation; and
decreasing the steering speed while the steering direction is greater than the cut-off directional variation.

25. The path planning method of claim 1, wherein the weighting value is analyzed to determine a steering direction and a steering speed of the navigation device, the path planning method further comprises:
setting a cut-off distance between the navigation device and the obstacle; and
decreasing the steering speed while the navigation device is approached to the cut-off distance.

26. A navigation device with a path planning function, the navigation device comprising:
a data communication unit adapted to acquire a two-dimensional depth map; and
a computing processor electrically connected with the data communication unit and adapted to analyze a two-dimensional depth map, to transform the two-dimensional depth map into a gray distribution map via statistics of pixel values on the two-dimensional depth map, to select a grid on the space matching map, to search a corresponding pixel count on the gray distribution map related to the selected grid, to apply a predetermined mask onto the corresponding pixel count and adjacent pixel counts to acquire a computed value filled in the selected grid, and to acquire a weighting value about each angle range of the space matching map in accordance with a distance from location of a pixel count to a reference point of the space matching map;
wherein the weighting value represents existential probability of an obstacle within the said angle range and a probable distance between the navigation device and the obstacle.

* * * * *